United States Patent

Detwiler et al.

[11] 3,894,804
[45] July 15, 1975

[54] INTENSITY LEVEL DISPLAY APPARATUS FOR RADIATION ANALYSIS

[75] Inventors: Grant R. Detwiler, Orange; Ronald E. Chastain, Tustin, both of Calif.

[73] Assignee: The United States of Amercia as represented by the Secretary of the Army, Washington, D.C.

[22] Filed: Apr. 18, 1974

[21] Appl. No.: 462,161

[52] U.S. Cl. ............... 356/121; 356/123; 356/152; 356/153; 250/224
[51] Int. Cl. ............................................. G01j 1/00
[58] Field of Search ........... 356/121, 122, 124, 125, 356/123, 152, 153; 250/224

[56] References Cited
UNITED STATES PATENTS 2,633,525  3/1953  Wells ................................. 356/121
3,495,913  2/1970  Hoagland .......................... 356/124

*Primary Examiner*—Ronald L. Wibert
*Assistant Examiner*—Paul K. Godwin
*Attorney, Agent, or Firm*—Robert P. Gibson; Nathan Edelberg; Jack W. Voigt

[57] ABSTRACT

An apparatus for radiation analysis is disclosed for providing alignment of complex groups of light source optical elements by continually displaying and scanning a beam shape and intensity obtained through the optical elements during alignment thereof. Optical elements for controlling the beam shape and the intensity of a light beam are manually adjusted to provide the desired beam shape. Alignment is terminated when the optimum intensity and beam shape conditions are obtained.

5 Claims, 3 Drawing Figures

INTENSITY LEVEL DISPLAY APPARATUS FOR RADIATION ANALYSIS

BACKGROUND OF THE INVENTION

Prior art methods of obtaining beam shape and intensity involve tedious and time consuming point by point measurements across the face of the beam. This results in a sampling of separate and distinct points without continuous sampling between points. Additional prior art methods include the actual rotation or movement of the optical source under test about the optical centerline of the source, which can involve tedious manual manipulations for large optical sources.

SUMMARY OF THE INVENTION

The instant invention is a device for providing precise alignment of complex groups of light source optical elements. During alignment the total output optical energy in terms of beam shape and intensity is continuously displayed. Radiation in the form of a light beam is focused on or directed toward a radiometer which is in a cyclic slew mode of operation allowing the radiometer to be driven repeatedly through the beam in the area of interest. Optical elements within the beam path are aligned by manual adjustment associated with each element while the effect on the light beam output is observed. Alignment is terminated when the desired optimum intensity and beam shape conditions have been obtained.

DESCRIPTION OF THE PREFERRED EMBODIMENT

Figure 1:
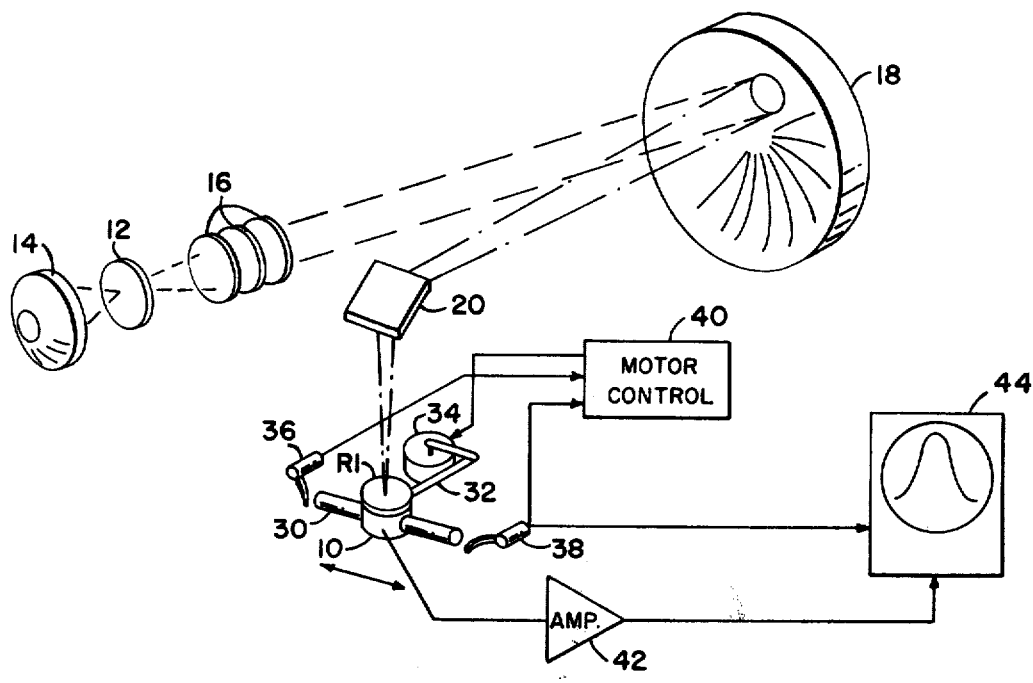
FIG. 1 is a simplified diagrammatic view illustrating the intensity level display apparatus with extraneous structure omitted.

Referring now to FIG. 1 of the drawings wherein the principle of operation of the invention may be seen, a radiometer 10 such as a bolometer or other thermal energy measuring device is disposed to receive energy from a light source. Typically, energy from light source 12 is reflected from a mirror 14 back through the source and through a selectable lens group 16 to a parabolic mirror 18. The energy impinging on mirror 18 is reflected to a beam splitter 20 or other reflective surface for directing the beam toward radiometer 10. The radiation is focused along the path of radiometer 10 which is disposed to be repeatedly driven back and forth through the beam in the area of interest. Elements 12, 14 and 16 are disposed for manual adjustment with respect to each other and parabolic mirror 18 to obtain the focusing effect of the light beam on the radiometer path of movement. Radiometer 10 is disposed for linear movement along a shaft 30. A moveable arm 32 is attached between radiometer 10 and a control motor 34 for moving the radiometer back and forth along the axis of movement across the path of the beam. Limit switches 36 and 38 are disposed at preselected points at the respective ends of shaft 30 for mechanically contacting the moveable radiometer at the preselected limit of movement to either end and reversing the direction of movement. Electrical outputs from limit switches 36 and 38 are coupled to a motor control unit 40 which has an output coupled to motor 34 to provide the controlling signals therefor in a manner well established in the prior art.

In response to the signal intensity sensed by radiometer 10 an electrical output signal is coupled to a preamplifier 42. An oscilloscope 44 has the signal input thereof coupled to the output of amplifier 42 for receiving the continuously amplified otput signal of the radiometer. The trigger input of oscilloscope 44 is coupled from limit switch 38 which indicates the beginning of another radiometer sweep across the light beam.

Figure 2:
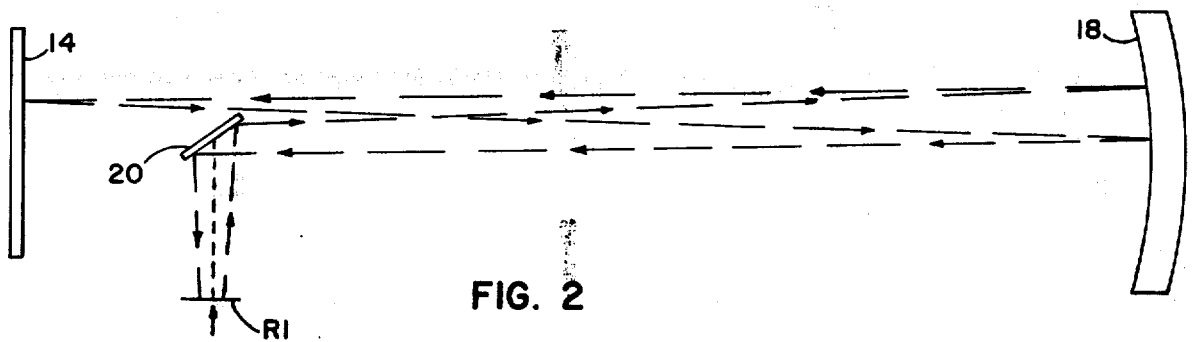
FIG. 2 is a diagram of the optical path through the system wherein a beam is reflected through the system and back upon itself.

FIG. 2 is a side view of the optical path of the system, disclosing a reticle R1 illuminated by optical energy which projects through the system and returns upon itself. For simplicity and illustration the beam is shown off center going through the system.

Figure 3:
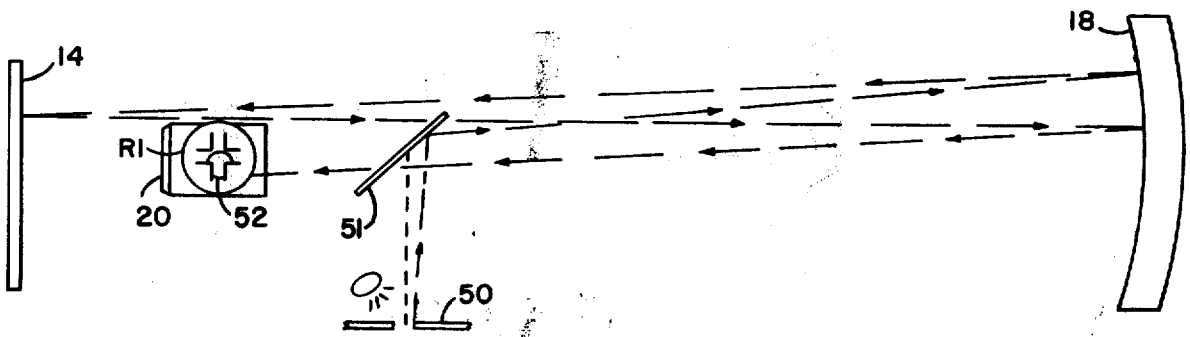
FIG. 3 discloses an optical path through the system wherein a beam is introduced through an aperture into the system and terminates at a preselected target.

Similarly, FIG. 3 is a bottom view of the optical path through the system. In preliminary alignment of the system elements, light source 12 could be turned off, and light from an external source could be reflected through the system from aperture plate 50. Optical energy entering the system would reflect from a reflector 51 and be projected through the system to reflect from mirror 20 and terminate at the reticle R1. The circle 52 is the image of the aperture in plate 50 reflected from element 20 and impinging on R1 from the rear. This misaligned image on R1 indicates that the aperture image from plate 50 is out of alignment with the reticle lines in R1, resulting in only limited energy being coupled therethrough.

With reticle R1 placed over the radiometer of FIG. 1 and optical energy introduced into the system through lens group 16, the projected beam may be focused and scanned to provide a scan across the surface of the beam along any line normal to and across the center axis of the beam merely by adjusting optical elements 12, 14 and 16. Optical lens group 16 may include, for example, a circular aperture and partially reflective mirror for projecting the desired beam shape and percentage of intensity of the beam toward the radiometer. An electrical signal from the radiometer is coupled to amplifier 42 and oscilloscope 44. The oscilloscope 44 then displays the variable intensity level across the face of the beam. The beam shape is readily apparent from the oscilloscope trace for comparison with the desired beam shape to be projected.

In operation, radiometer 10 is positioned in the beam from source 12 and an optical axis is established normal to the plane of the radiometer sensor 10 or reticle R1. Control motor 40 is activated and the radiometer and reticle are moved across the face of the beam until limit switch 36 or 38 is contacted, at which time a pulse is coupled to motor control 40. Motor control 40 then reverses the scan path across the beam. As shown, when limit switch 38 is contacted, a trigger input is coupled to oscilloscope 44, which initiates a new scan. The scan of radiometer 10 back and forth across the face of the optical beam may be maintained along the same line across the face of the beam while elements 12, 14 and 16 are aligned to provide or adjust the beam shape desired. The adjustable elements are individually adjusted while the representative output image is observed on the oscilloscope in obtaining the desired beam shape.

Obviously modification and variations of the present invention are possible in light of the above disclosure. For example, both limit switches may be coupled to the oscilloscope to provide a single trace after each individual scan across the beam. A viewing eyepiece may be disposed adjacent the beamsplitter for viewing the optical image illuminating the reticle and thereby provide for fine adjustments in the optical coupling elements if desired. It is, therefore, to be understood that within the scope of the appended claims, the invention may be practiced otherwise than as specifically disclosed herein.

We claim:

1. Light beam intensity level scanning and display apparatus for alignment of optical elements comprising: first and second optical reflectors, a light source for generating a light beam which impinges on said reflectors, adjustable optical coupling means disposed between said reflectors for adjustable alignment therebetween to obtain a selectable light beam shape and intensity, a radiometer responsive to said light beam and having a proportional electrical output, a reflective surface disposed for receiving the light beam reflected from said second optical reflector for coupling energy from said second reflector to said radiometer, driving means coupled to said radiometer for sweeping said radiometer back and forth across the path of said beam, and an oscilloscope coupled to said radiometer output for displaying the intensity of radiant energy sampled as the radiometer traverses the beam.

2. Light beam intensity level scanning and display apparatus as set forth in claim 1 wherein said reflective surface is a beam splitter for reducing the beam intensity coupled to the radiometer and said second reflector is a parabolic mirror.

3. Light beam intensity level scanning and display apparatus as set forth in claim 2 wherein said driving means is a driving motor assembly comprising a drive motor mechanically linked to said radiometer for moving the radiometer back and forth across a sweep path, a motor control unit coupled to the drive motor for controlling the direction of movement, and first and second limit switches predisposed at opposing ends of the radiometer sweep path and electrically coupled to said motor control for periodically reversing the direction of radiometer travel.

4. Beam intensity level scanning and display apparatus as set forth in claim 3 wherein said first limit switch has an electrical output coupled to a trigger input of the oscilloscope for periodically reactivating the oscilloscope trace as the radiometer sweep recurrs.

5. Beam intensity level scanning and display apparatus as set forth in claim 4 wherein a reticle is disposed adjacent the radiometer for controlling the light beam coupled thereto.

* * * * *